United States Patent
Panchal

(10) Patent No.: US 11,266,966 B2
(45) Date of Patent: Mar. 8, 2022

(54) PROCESS AND APPARATUS FOR FLUIDIZING A CATALYST BED

(71) Applicant: UOP LLC, Des Plaines, IL (US)

(72) Inventor: Dharmesh C. Panchal, Surbiton (GB)

(73) Assignee: UOP LLC, Des Plaines, IL (US)

( * ) Notice: Subject to any disclaimer, the term of this patent is extended or adjusted under 35 U.S.C. 154(b) by 1095 days.

(21) Appl. No.: 15/851,613

(22) Filed: Dec. 21, 2017

(65) Prior Publication Data

US 2019/0193041 A1 Jun. 27, 2019

(51) Int. Cl.
*B01J 8/00* (2006.01)
*B01J 8/18* (2006.01)
*B01J 8/24* (2006.01)
*B01J 8/26* (2006.01)
*B01J 38/32* (2006.01)
*C10G 11/18* (2006.01)
(Continued)

(52) U.S. Cl.
CPC .......... *B01J 8/1836* (2013.01); *B01J 8/1818* (2013.01); *B01J 38/32* (2013.01); *F28D 7/0066* (2013.01); *F28D 7/12* (2013.01); *B01J 2208/00132* (2013.01); *B01J 2208/00938* (2013.01)

(58) Field of Classification Search
CPC ......... C10G 11/00; C10G 11/14; C10G 11/18; C10G 11/187; C10G 2300/00; C10G 2300/40; C10G 2300/4031; F28D 7/00; F28D 7/0066; F28D 7/10; F28D 7/12; B01J 8/00; B01J 8/18; B01J 8/1818; B01J 8/1836; B01J 8/24; B01J 8/26; B01J 38/00; B01J 38/04; B01J 38/12; B01J 38/30; B01J 38/32; B01J 2208/00; B01J 2208/00008; B01J 2208/00017; B01J 2208/00106; B01J 2208/00132; B01J 2208/00716; B01J 2208/00796; B01J 2208/00823; B01J 2208/00831; B01J 2208/0084; B01J 2208/00893; B01J 2208/00902; B01J 2208/00938
See application file for complete search history.

(56) References Cited

U.S. PATENT DOCUMENTS 4,582,120 A * 4/1986 Walters .................. B01J 8/1836
165/104.16
4,605,636 A 8/1986 Walters et al.
(Continued)

FOREIGN PATENT DOCUMENTS

CN 203222574 U 10/2013
WO 2012118710 A2 9/2012

OTHER PUBLICATIONS

First Examination Report for corresponding Indian Application No. 202017025769.
(Continued)

*Primary Examiner* — Natasha E Young
(74) *Attorney, Agent, or Firm* — Paschall & Associates, LLC; James C. Paschall

(57) ABSTRACT

A process and apparatus is disclosed for gradually starting fluidization in a bed of particulate from the top down so as to avoid thrusting the entire mass of particulates upwardly in the bed at the same time which may damage internals in the bed. The particulate bed may comprise a catalyst cooler for an FCC unit containing internals such as cooling, fluidization and support equipment.

15 Claims, 1 Drawing Sheet

(51) Int. Cl.
F28D 7/00 (2006.01)
F28D 7/12 (2006.01)

(56) References Cited

U.S. PATENT DOCUMENTS

| | | | |
|---|---|---|---|
| 4,822,761 A * | 4/1989 | Walters | B01J 8/0055 |
| | | | 208/113 |
| 5,027,893 A | 7/1991 | Cetinkaya et al. | |
| 5,066,627 A | 11/1991 | Owen et al. | |
| 5,141,712 A | 8/1992 | Avidan | |
| 5,209,287 A * | 5/1993 | Johnson | B01J 8/1836 |
| | | | 165/104.16 |
| 5,827,793 A | 10/1998 | Hu | |

OTHER PUBLICATIONS

Office Action for corresponding CN Application No. 201880087206.9 dated Oct. 11, 2021.

* cited by examiner

PROCESS AND APPARATUS FOR FLUIDIZING A CATALYST BED

FIELD

The field is fluidized beds and particularly catalyst cooler fluidization for a catalytic regenerator such as in a fluid catalytic cracking (FCC) unit or an MTO unit.

BACKGROUND

FCC technology has undergone continuous improvement and remains the predominant source of gasoline production in many refineries. This gasoline, as well as lighter products, is formed as the result of cracking heavier, higher molecular weight, less valuable hydrocarbon feed stocks such as gas oil.

In its most general form, the FCC process comprises a reactor that is closely coupled with a regenerator, followed by downstream hydrocarbon product separation. Hydrocarbon feed contacts catalyst in the reactor to crack the hydrocarbons down to smaller molecular weight products. During this process, coke tends to accumulate on the catalyst. Coke must be burned off of the catalyst in a regenerator.

When a catalyst is exposed to oxygenates, such as methanol, to promote a reaction to olefins in a methanol to olefins process (MTO), carbonaceous material is generated and deposited on the catalyst. Accumulation of coke deposits interferes with the catalyst's ability to promote the MTO reaction. As the amount of coke deposit increases, the catalyst loses activity and less of the feedstock is converted to the desired olefin product. The step of regeneration removes the coke from the catalyst by combustion with oxygen, restoring the catalytic activity of the catalyst. The regenerated catalyst may then be exposed again to oxygenates to promote the conversion to olefins.

Conventional regenerators typically include a vessel having a spent catalyst inlet, a regenerated catalyst outlet and a combustion gas distributor for supplying air or other oxygen containing gas to the bed of catalyst that resides in the vessel. Cyclone separators remove catalyst entrained in the flue gas before the flue gas exits the regenerator vessel.

There are several types of catalyst regenerators in use today. The conventional bubbling bed regenerator typically has just one chamber in which air is bubbled through a dense catalyst bed. Spent catalyst is added and regenerated catalyst is withdrawn from the same dense catalyst bed. Relatively little catalyst is entrained in the combustion gas exiting the dense bed.

Two-stage bubbling beds and combustor regenerators have two chambers. In a two-stage bubbling bed regenerator, spent catalyst is added to a dense bed in a first, upper chamber stage and is partially regenerated with air. The partially regenerated catalyst is transported to a dense bed in a second, lower chamber stage and completely regenerated with air. The completely regenerated catalyst is withdrawn from the second chamber.

Complete catalyst regeneration can be performed in a dilute phase, fast-fluidized, combustion regenerator. Spent catalyst is added to a lower chamber and is transported upwardly by air under fast fluidized flow conditions while completely regenerating the catalyst. The regenerated catalyst is separated from the flue gas by a primary separator upon entering into an upper chamber in which regenerated catalyst and flue gas are disengaged from each other.

Catalyst coolers have been used to cool regenerated catalyst and permit the regenerator and the reactor to operate under independent conditions. In catalyst coolers, hot regenerated catalyst is cooled by indirect heat exchange with water which vaporizes to steam in nested cooler tubes. The steam is removed from the catalyst cooler for other uses; whereas, the cooled catalyst is returned to the regenerator.

Catalyst coolers are typically fluidized by fluidization lances suspended in the catalyst cooler from a fluidization manifold located in the top of the cooler. The long fluidization lances hang down to near the bottom of the nested cooler tubes. A supply nozzle to the fluidization manifold is attached to the shell of the cooler, so is anchored in place. The nested cooler tubes and the fluidization manifold grow upward relative to the supply nozzle due to thermal expansion. Therefore, the fluidization manifold has to be flexible enough to accommodate this thermal growth.

Shut downs of a regenerator are costly due to the fact that product is not being made during shut down. Hence, shut downs should be minimized to maximize profitability.

If catalyst cooler operation is interrupted, the catalyst bed in the cooler must be re-fluidized. Improved ways of designing and operating catalyst coolers are sought.

SUMMARY

We have discovered that on start-up of fluidization of a catalyst bed in a catalyst cooler, fluidizing gas may thrust a large mass of catalyst against the internals in the catalyst cooler and damage them. The process and apparatus gradually starts fluidization of the catalyst bed from the top down so as to avoid thrusting the entire mass of catalyst upwardly in the cooler at the same time.

Additional features and advantages of the invention will be apparent from the description of the invention, figures and claims provided herein.

DEFINITIONS

Figures 1, 2, 3:
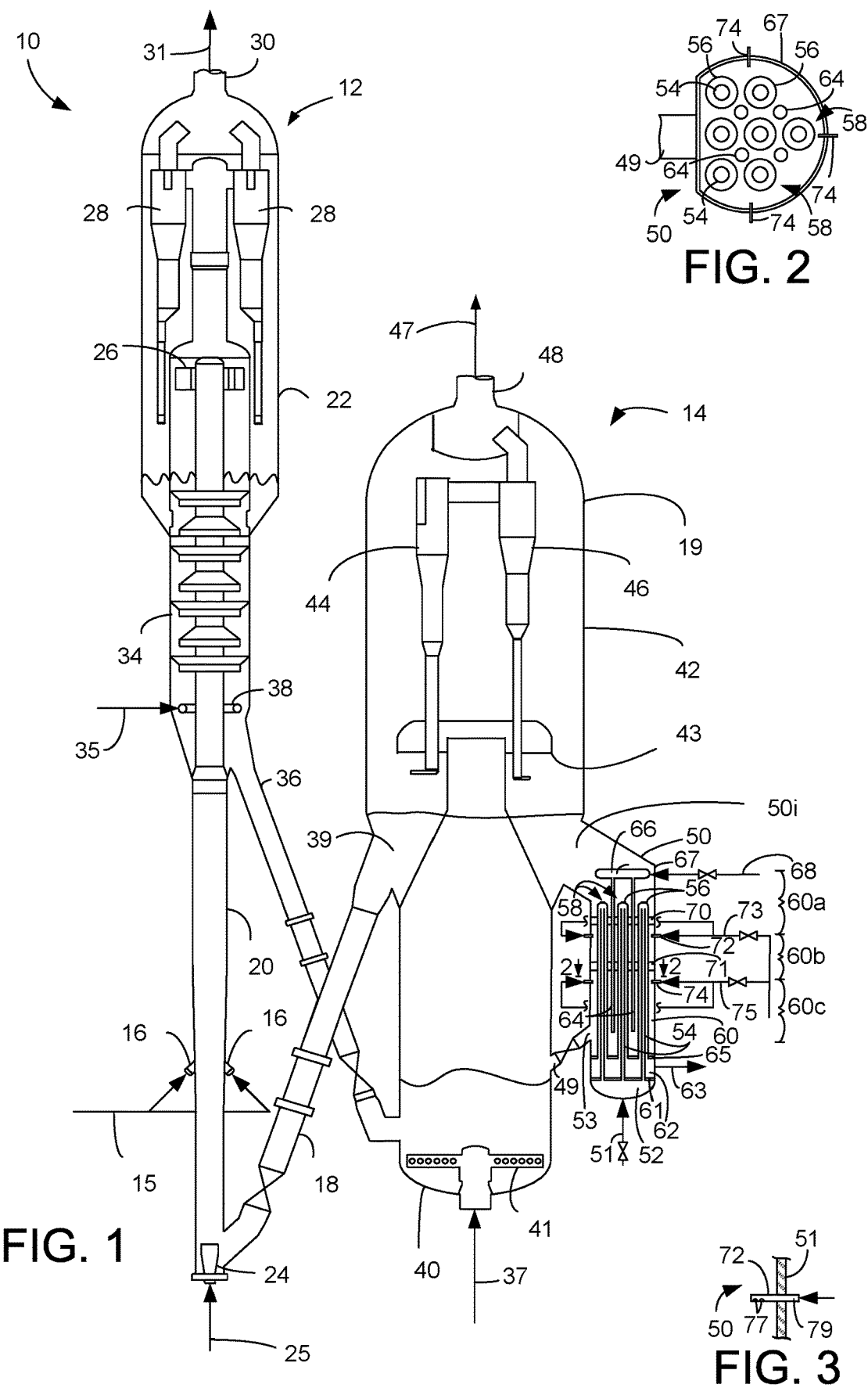
FIG. 1 is a schematic drawing of an FCC unit of the present invention.
FIG. 2 is an enlarged section taken at segment 2-2.
FIG. 3 is an enlarged portion of FIG. 1.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through any other intervening vessel.

The term "indirect communication" means that flow from the upstream component enters the downstream component after passing through an intervening vessel.

The term "bypass" means that the object is out of downstream communication with a bypassing subject at least to the extent of bypassing.

As used herein, the term "separator" means a vessel which has an inlet and at least two outlets.

As used herein, the term "predominant" or "predominate" means greater than 50 wt %, suitably greater than 75 wt % and preferably greater than 90 wt %.

As used herein, the term "a component-rich stream" means that the rich stream coming out of a vessel has a greater concentration of the component than the feed to the vessel.

DETAILED DESCRIPTION

We have found that re-fluidizing the catalyst in a catalyst cooler after fluidization air has been interrupted may lead to thrusting the mass of catalyst against catalyst cooler internals including aeration lances. Aeration lances typically are suspended in the catalyst cooler for delivering air to a lower section of the catalyst bed. It is proposed to add fluidization distributors below an upper section of the catalyst bed to begin fluidization of the upper section before initiating fluidization of a lower section. Hence, the catalyst bed is gradually fluidized in stages. The bulk of the catalyst bed is not lifted in one movement so as to thrust the bulk of the catalyst mass at internals, so as to avoid damage thereto.

The embodiments herein are applicable to any fluidized bed of particulate material. One such application is a catalyst cooler for cooling regenerated catalyst from a FCC or a MTO regenerator. For simplicity, the process and apparatus will be described in the context of an FCC unit.

Now turning to the FIGS. wherein like numerals designate like components, the FIG. 1 illustrates a process and apparatus comprising an FCC unit 10. An FCC unit 10 includes a catalytic reactor 12 and a regenerator 14 fluidly connected to each other. Process variables typically include a cracking reaction temperature of 400° to 600° C. and a catalyst regeneration temperature of 500° to 900° C. Both the cracking and regeneration occur at an absolute atmospheric pressure below 5 atmospheres.

The FIGURE shows a typical FCC process unit, in which a heavy hydrocarbon feed or raw oil stream in a line 15 is distributed by distributors 16 into a riser 20 to be contacted with a newly regenerated cracking catalyst entering from a regenerator conduit 18. This contacting may occur in the narrow riser 20, extending upwardly to the bottom of a reactor vessel 22. The catalyst is fluidized and lifted to the heavy hydrocarbon feed stream by fluidizing gas from a fluidizing distributor 24 fed by fluidizing line 25. Heat from the catalyst vaporizes the heavy hydrocarbon feed, and the heavy hydrocarbon feed is thereafter catalytically cracked to lighter molecular weight hydrocarbons in the presence of the catalyst as both are transferred up the riser 20 into the reactor vessel 22. The cracked light hydrocarbon products are thereafter separated from the cracking catalyst using cyclonic separators which may include a rough cut separator 26 and one or two stages of cyclones 28 in the reactor vessel 22. Product gases exit the reactor vessel 22 through a product outlet 30 into a product line 31 for transport to a product recovery section which is not shown. Inevitable side reactions occur in the riser 20 leaving coke deposits on the catalyst that lower catalyst activity. The spent catalyst requires regeneration for further use. Spent catalyst, after separation from the gaseous product hydrocarbon, falls into a stripping section 34 where steam from line 35 is fed to a stripping distributor 38 which strips any residual hydrocarbon vapor from the spent catalyst. After the stripping operation, the spent catalyst is fed to the catalyst regenerator 14 through a spent catalyst conduit 36.

The most common of such conventional heavy hydrocarbon feed streams is a VGO, which is typically a hydrocarbon material having a boiling range with an IBP of at least about 232° C. (450° F.), a T5 of about 288° C. (550° F.) to about 343° C. (650° F.), a T95 between about 510° C. (950° F.) and about 570° C. (1058° F.) and an EP of no more than about 626° C. (1158° F.) prepared by vacuum fractionation of atmospheric residue. Atmospheric residue (AR) is an alternative feedstock boiling with an IBP of at least about 315° C. (600° F.), a T5 between about 340° C. (644° F.) and about 360° C. (680° F.) and a T95 of between about 700° C. (1292° F.) and about 900° C. (1652° F.) obtained from the bottoms of an atmospheric crude distillation column. AR comprise many coke precursors and other contaminants. Other heavy hydrocarbon feed stocks which may serve as a heavy hydrocarbon feed stream include heavy bottoms from crude oil, heavy bitumen crude oil, shale oil, tar sand extract, deasphalted residue, products from coal liquefaction, and vacuum reduced crudes. A suitable heavy hydrocarbon feed stream also includes mixtures of the above hydrocarbons and the foregoing list is not exhaustive.

The FCC catalyst can be a single catalyst or a mixture of different catalysts. Generally, the catalyst may include any of the well-known catalysts that are used in the art of FCC, such as an active amorphous clay-type catalyst and/or a high activity, crystalline molecular sieve. Zeolites may be used as molecular sieves in FCC processes. Typically, the zeolitic molecular sieves appropriate for FCC have a large average pore size. Usually, molecular sieves with a large pore size have pores with openings of greater than about 0.7 nm in effective diameter defined by greater than about 10, and typically about 12, member rings. Suitable large pore zeolite catalysts may include synthetic zeolites such as X and Y zeolites, mordenite and faujasite. The zeolite can have any suitable amount of a rare earth metal or rare earth metal atoms in oxide form. Suitably, the FCC catalyst includes a large pore zeolite, such as a Y-type zeolite, and a matrix material comprising an active alumina material, a binder material, including either silica or alumina, and an inert filler such as kaolin. The ratio of zeolite to matrix in the FCC catalyst stream should be no more than 2. Other suitable FCC catalysts include Amber from Albemarle Corporation located in Baton Rouge, La., Stamina from BASF Corporation from Iselin, N.J. or Midas from WR Grace and Co. from Columbia, Md. A small to medium pore zeolite such as comprising a MFI type of catalyst may also be part of the FCC catalyst.

FIG. 1 depicts a regenerator 14 comprising a regenerator vessel 19 known as a combustor. However, other types of regenerators are suitable such as one or two-stage bubbling beds. In the catalyst regenerator 14, a stream of oxygen-containing gas, such as air, is introduced from a main air line 37 from a main air blower, not shown, through a main air distributor 41 to contact the spent catalyst in a first, lower chamber 40, combust coke deposited thereon, and provide regenerated catalyst and flue gas. The catalyst regeneration process adds a substantial amount of heat to the catalyst, providing energy to offset the endothermic cracking reactions occurring in the riser 20. Catalyst and air flow upwardly together along a combustor riser located within the catalyst regenerator 14 and, after regeneration, are initially disengaged by discharge into an upper chamber 42 through a disengager 43. Finer separation of the regenerated catalyst and flue gas exiting the disengager 43 is achieved using first and second stage separator cyclones 44, 46, respectively within the upper chamber 42 of the catalyst regenerator 14. Catalyst separated from flue gas dispenses through dip legs from cyclones 44, 46 into a catalyst bed while flue gas relatively lighter in catalyst sequentially exits cyclones 44, 46 and is discharged from the regenerator vessel 14 through a flue gas outlet 48 in a flue gas line 47.

Regenerated catalyst may be recycled back to the reactor 12 through the regenerator conduit 18. The riser 20 of the reactor 12 may be in downstream communication with the regenerator vessel 19 of the regenerator 14. The regenerator conduit has an inlet end connecting to the regenerator vessel 19, in an aspect the upper chamber 42 of the regenerator vessel 19, for receiving regenerated catalyst therefrom and an outlet end connecting to the riser 20 of the reactor 12 for transporting regenerated catalyst to the riser 20 of the reactor 12. As a result of the coke burning, the flue gas vapors exiting at the top of the catalyst regenerator 14 in the flue gas line 48 contain $SO_x$, $NO_x$, CO, $CO_2$, $N_2$, $O_2$ and $H_2O$, along with smaller amounts of other species. Additionally, some of these species may exit with regenerated catalyst exiting in a regenerator conduit 18 and enter the riser 20 of the reactor 12.

The regenerator 14 may include a catalyst cooler 50 in downstream communication with and fluid connection to the regenerator 14 and particularly the regenerator vessel 19. The catalyst cooler cools the hot catalyst from the regenerator to remove heat from the FCC unit 10. Catalyst is transported from the regenerator 14, particularly from the bed 39 in the upper chamber 42 of the regenerator vessel 19, into the catalyst cooler 50. In a combustor regenerator shown in the FIG. 1, regenerated catalyst may be transported from the upper chamber 42 into the lower chamber 40 of the regenerator vessel 19 through the catalyst cooler 50 and/or through recycle conduits that are not shown. Regenerated catalyst enters the catalyst cooler 50 through an inlet 50i. Regenerated catalyst may exit the catalyst cooler back through the inlet 50i in a back-mix catalyst cooler. In a flow-through catalyst cooler, cooled catalyst exits through an outlet 53 to a cool catalyst conduit 49 which introduces cooled, regenerated catalyst back into the lower chamber 40 through a control valve. Evidently, if the regenerator only has a single chamber, inlet 50i would be from and the outlet 53 would be to the same regenerator chamber.

The catalyst cooler 50 comprises a vessel with an outer wall 67 that includes at least one nested tube pair 58 comprising an inner tube 54 nested within at least an outer tube 56. In an aspect, the catalyst cooler 50 comprises a vessel that includes a plurality of nested tube pairs 58 comprising a plurality of inner tubes 54 nested within and surrounded by a respective outer tube 56 in a plurality of outer tubes. The nested tube pairs 58 may be vertically oriented. Only three nested tube pairs are shown in FIG. 1, but many more are contemplated. Liquid water or lower pressure steam from a water line 51 feeds a water manifold 52. The water manifold 52 is defined by a water tube sheet 61 that only communicates with the inner tube(s) 54. The inner tubes 54 are in direct, downstream communication with the water manifold 52. Water is delivered to inlet ends of the inner tubes 54. The inlet ends are open and coincident with openings in the water tube sheet 61. Water flows up the inner tube(s) 52 into the interior of the catalyst cooler 50 containing a catalyst bed 60. Heat transfers across respective walls of the inner tubes 54 from heated water in the outer tubes 56. The water in the outer tubes 56 indirectly absorbs heat from the hot, regenerated catalyst in the catalyst bed 60, thereby indirectly cooling the regenerated catalyst in the catalyst bed, while heating the water in the outer tubes 56. The transfer of heat to the water in the outer tube(s) 56 and the inner tube(s) 54 vaporizes it to higher pressure steam. The vaporized water is discharged through open outlet ends of the inner tubes 54 into the outer tubes 56. The outer tubes 56 are equipped with end walls defining closed inlet ends that are opposed to and spaced from the open outlet ends of the inner tubes 54. The vaporized water is discharged from the outlet ends against the end walls of the outer tubes 56 which receive water interiorly to the inlet ends. The vaporized water reverses its flow direction upon entering the outer tubes 56 and flows in an opposite direction. As the vaporized water travels through the outer tubes 56 heat is passed from the catalyst bed 60 across the wall of the outer tubes 56 to the water in the outer tubes.

The steam which may be mixed with liquid water travels down the outer tube(s) 56 annular to the respective inner tube(s) 54 in the nested tube pair 58 and exits from open outlet ends of the outer tubes 56. The outlet ends have openings that are coincident with openings in the outlet tube sheet 65. Vaporized water exits the outer tubes 56 and is withdrawn from the catalyst bed 60 from the outer tube(s) into the outlet manifold 62. The outlet manifold 62 is defined by the water tube sheet 61 and an outlet tube sheet 65. The outlet manifold is in direct, downstream communication with said outer tubes 56 and collects vaporized water from the outer tubes. The inner tubes 54 extend through the outlet manifold 62 but only communicate with the outlet manifold through the outlet tubes 56 which directly communicate with the outlet manifold through the outlet tube sheet 65. Steam from the outlet manifold 62 exits the catalyst cooler 50 in a steam line 63.

Lower fluidization distributors 64 comprising fluidization lances receive fluidization gas such as air from a lower fluidization manifold 66 that communicates only with the lower fluidization distributors for fluidizing regenerated catalyst in the catalyst bed 60 in the catalyst cooler 50. The lower fluidization manifold 66 is fed by a lower fluidization line 68. The lower fluidization distributors 64 may emit fluidization gas only from their lower end. A conventional example of a catalyst cooler is provided in U.S. Pat. No. 5,027,893.

Baffle guides 70 and 71 extend across the catalyst cooler 50 to hold internals, nested tube pairs 58 and lower fluidization distributors 64, in place laterally but allow them to freely expand and contract longitudinally due to thermal forces.

The catalyst cooler 50 receives hot catalyst from the catalyst bed 39 in the regenerator 14 through inlet 50i which collects in the catalyst bed 60 in the catalyst cooler. Hot catalyst is cooled in the catalyst bed 60 by water circulating though the nested tube pairs 58. In a back mixed cooler, catalyst enters and exits the catalyst cooler 50 through the same inlet 50i. In a flow through catalyst cooler, cooled catalyst exists the catalyst cooler 50 through the outlet 53.

The catalyst bed 60 may be divided into sections. The number of sections is not limited, but two to three sections will be adequate. For example, the catalyst bed 60 can be divided up into two to three sections: an upper section 60a, an optional intermediate section 60b and a lower section 60c. An upper distributor 72 is located below the upper section 60a and above the intermediate section 60b and the lower section 60c and may distribute fluidizing gas below the upper section 60a from an upper fluidization manifold 73. The fluidizing gas from the upper fluidization distributor 72 rises into the upper section 60a to fluidize the upper section. An optional intermediate fluidization distributor 74 is located below the intermediate section 60b, above the lower section 60c and below the upper section 60a and may distribute fluidizing gas below the upper section and the intermediate section 60b from an intermediate fluidization manifold 75. The fluidizing gas from the intermediate fluidization distributor rises into the intermediate section 60b to fluidize the intermediate section and then into the upper section 60a to fluidize the upper section.

The sections of the catalyst bed 60 are demarcated by the respective fluidization distributor below the catalyst bed section to just below the next higher fluidization distributor or to the top of the bed if there is no other fluidization distributor above the respective fluidization distributor. For example, the upper section 60a is demarcated by the upper fluidization distributor(s) 72 to the top of the catalyst bed 60. The optional intermediate section 60b is demarcated by the intermediate fluidization distributor(s) 74 to just below the upper fluidization distributor(s) 72. The lower section 60c is demarcated by the bottom of the lower fluidization distributors 64, particularly to below the lower fluidization distributors to the level at which the lances jet fluidizing gas, to just below the next higher fluidization distributor(s): the intermediate fluidization distributor(s) 74, if used, or the upper fluidization distributor(s) 72.

FIG. 2 is a sectional view taken at 2-2 in FIG. 1. FIG. 2 shows three optional intermediate fluidization distributors 74 located at 90, 180 and 270° relative to the cool catalyst conduit 49. More or less intermediate fluidization distributors 74 may be used. In a back mix cooler which comprises no cool catalyst conduit 49, an additional intermediate fluidization distributor 74 may be located at the 0° position also amounting to four optional intermediate fluidization distributors. Upper fluidization distributors 72 may be located at the same radial positions as the intermediate fluidization distributors 74 depicted in FIG. 2. More or less upper fluidization distributors 72 may be used. Four lower fluidization distributors 64 are shown in FIG. 2 located between seven nested tube pairs 58 comprising inner tubes 54 and outer tubes 56. More or less lower fluidization distributors 64 and nested tube pairs 58 are contemplated.

FIG. 3 depicts an embodiment of the upper fluidization distributor 72 protruding through laterally through a side 51 of the catalyst cooler 50. One, two or more openings 77 in a bottom of a pipe 79 may comprise the upper fluidization distributor 72.

Turning back to FIG. 1, the lower distributors 64 comprising lances may have an opening(s) in a lower end of a longitudinally extending pipe. The openings may be located below the lower section 60c to fluidize the lower section with fluidizing gas from the lower fluidization manifold 66. Fluidizing gas from lower fluidization distributors 64 may jet down into the catalyst bed to fluidize the very bottom of the catalyst bed 60 even though the lances do not extend all the way to the very bottom.

Normally, after start up, fluidization of the catalyst bed 60 may be achieved by distributing fluidizing gas from the lower fluidization distributors 64 which inject fluidizing gas into the lower section 60c to fluidize the entire catalyst bed 60. Little or no fluidization gas need be distributed from the upper fluidization distributors 72 and the optional intermediate fluidization distributors 74.

In the event that fluidization gas from the fluidization gas line 68 distributed through the lower fluidization distributors 64 is interrupted such that fluidization of the catalyst bed 60 in the catalyst cooler 50 ceases, the catalyst bed must be re-fluidized. Sudden re-fluidization may lift the bulk of the catalyst bed 60 and thrust it against internals in the catalyst cooler 50, internals such as the lower fluidization distributors 64, the fluidization manifold 66 or the baffle guides 70 or 71. The thrust of such a large mass of catalyst as one mass can damage the internals. A way has been discovered to avoid such damage on re-fluidization of the catalyst bed 60 by gradually fluidizing the bed from top down.

To restart fluidization of the catalyst bed 60 in the catalyst cooler 50 after fluidization from lower fluidization distributors 64 has been interrupted, the control valve on the water line 51 should be opened to ensure water circulation to the inner tubes 54 to cool the catalyst bed 60, and the main air blower feeding air line 37 to the regenerator 14 should be operative. And, if the catalyst cooler 50 has a separate catalyst cooler outlet 50o to a cool catalyst conduit 49, the control valve on the catalyst conduit should be open to allow cooled catalyst to exit the catalyst cooler 50 enter the regenerator 14.

To begin fluidization of the catalyst bed 60, fluidization of the upper section 60a of the catalyst bed 60 should begin first by opening the control valve on the upper fluidization manifold 73 to distribute fluidizing gas to the upper fluidization distributor(s) 72. The control valve on the upper fluidization manifold 73 may be gradually opened until it is completely opened more than 20-25% of completely opened to reasonably fluidize the entire upper section 60a. If the catalyst bed 60 includes an intermediate section 60b meaning the catalyst cooler is equipped with intermediate fluidization distributors 74, fluidization of the intermediate section 60b of the catalyst bed 60 should be initiated after fluidizing the upper section 60a. The control valve on the intermediate fluidization manifold 75 may be gradually opened until it is completely opened more than 20-25% of completely opened to reasonably fluidize the entire intermediate section 60b. At this point the intermediate section 60b and the upper section 60a will be completely fluidized. By initiating the fluidization of the upper section 60a before initiating fluidization of the intermediate section 60b, the mass of catalyst in the catalyst bed will be gradually fluidized in stages avoiding sudden thrust into the internals.

After the upper section 60a is fluidized and after the optional intermediate section 60b is fluidized if there is one, fluidization of the lower section 60c of the catalyst bed 60 should be initiated after fluidizing the upper section 60a and optionally the intermediate section 60b. The control valve on the lower fluidization manifold 68 may be gradually opened to about 5 to about 10% of normal operating flow rate until it is completely opened more than 20-25% of completely opened to fluidize the entire lower section 60c. At this point the lower section 60c, the optional intermediate section 60b and the upper section 60a will be completely fluidized. By initiating the fluidization of the upper section 60a before initiating fluidization of the lower section 60c and perhaps before initiating fluidization of the intermediate section 60b before initiating fluidization of the lower section 60c, the entire mass of catalyst in the catalyst bed will not be suddenly fluidized and thrust into the internals in the catalyst cooler 50 preserving them from damage. Once the control valve on the lower fluidization manifold 66 is completely opened to the normal flow rate, the control valves on the upper fluidization manifold 73 and the optional intermediate fluidization manifold 75 may be turned down to reduce the flow rate therethrough or turned off. Some flow through the control valves on the upper fluidization manifold 73 and the optional intermediate fluidization manifold 75 may proceed during normal operation to prevent ingress by catalyst.

The upper fluidization distributors 72 and the intermediate fluidization distributors 74 should be sized to provide 1 to 5 times the $u_{mf}$, which is the minimum fluidization velocity for FCC catalyst of between about 0.0007 and about 0.0009 m/s.

Specific Embodiments

While the following is described in conjunction with specific embodiments, it will be understood that this description is intended to illustrate and not limit the scope of the preceding description and the appended claims.

A first embodiment of the invention is a process for fluidizing a bed of catalyst in a vessel comprising internals and the bed of catalyst fluidizing an upper section of the bed of catalyst by distributing gas below the upper section; fluidizing a lower section of the bed of catalyst that is below the upper section by distributing gas below the lower section; and initiating the fluidizing of the upper section before initiating the fluidizing of the lower section. An embodiment of the invention is one, any or all of prior embodiments in this paragraph up through the first embodiment in this paragraph further comprising fluidizing an intermediate section of the bed of catalyst that is below the upper section and above the lower section by distributing gas below the intermediate section and above the lower section and initiating the fluidizing of the upper section before initiating the fluidizing of the intermediate section and initiating the fluidizing of the intermediate section before initiating the fluidizing of the lower section. An embodiment of the invention is one, any or all of prior embodiments in this paragraph up through the first embodiment in this paragraph further comprising fluidizing the upper section with gas distributed from a fluidization distributor protruding laterally through the side of the vessel. An embodiment of the invention is one, any or all of prior embodiments in this paragraph up through the first embodiment in this paragraph further comprising fluidizing the lower section with gas distributed from an elongated fluidization distributor extending longitudinally through the vessel. An embodiment of the invention is one, any or all of prior embodiments in this paragraph up through the first embodiment in this paragraph further comprising reducing the flow rate of fluidizing gas below the upper section to fluidize the upper section after initiating fluidizing the lower section. An embodiment of the invention is one, any or all of prior embodiments in this paragraph up through the first embodiment in this paragraph further comprising increasing the flow rate of distributing gas below the lower section for fluidizing the lower section gradually. An embodiment of the invention is one, any or all of prior embodiments in this paragraph up through the first embodiment in this paragraph further comprising delivering water to an inner tube of a nested tubes; indirectly heating the water to steam or to higher pressure steam in the catalyst bed; withdrawing the steam from the catalyst bed through an outer tube of the nested tubes. An embodiment of the invention is one, any or all of prior embodiments in this paragraph up through the first embodiment in this paragraph further comprising combusting coke from spent catalyst in a regenerator to provide regenerated catalyst and flue gas; passing hot catalyst from the regenerator to the vessel to cool the hot catalyst; and passing cooled catalyst back to the regenerator.

A second embodiment of the invention is an apparatus for fluidizing catalyst comprising a vessel comprising vertical nested tubes; an upper fluidization distributor for delivering gas to an upper section of the vessel; and a lower fluidization distributor for delivering gas to a lower section of the vessel below the upper section. An embodiment of the invention is one, any or all of prior embodiments in this paragraph up through the second embodiment in this paragraph wherein the lower fluidization distributor comprise a longitudinal gas lance disposed between the nested tubes which emits gas below the upper section and to the lower section. An embodiment of the invention is one, any or all of prior embodiments in this paragraph up through the second embodiment in this paragraph wherein the upper fluidization distributor comprise a lateral pipe protruding through a wall of the vessel. An embodiment of the invention is one, any or all of prior embodiments in this paragraph up through the second embodiment in this paragraph further comprising an intermediate fluidization distributor for delivering gas to an intermediate section of the vessel below the upper section and above the lower section. An embodiment of the invention is one, any or all of prior embodiments in this paragraph up through the second embodiment in this paragraph wherein the vessel further is connected to a regenerator vessel that is connected to a catalytic reactor.

A third embodiment of the invention is a process for starting fluidization of a bed of catalyst in a catalyst cooler vessel comprising internals and the bed of catalyst fluidizing an upper section of the bed of catalyst by distributing gas below the upper section; fluidizing a lower section of the bed of catalyst that is below the upper section by distributing gas below the lower section; initiating the fluidizing of the upper section before initiating the fluidizing of the lower section; combusting coke from spent catalyst in a regenerator vessel and disengaging hot catalyst from flue gas in the regenerator vessel; and passing the hot catalyst to the catalyst cooler vessel to the bed of catalyst to cool the hot catalyst; and passing the cooled catalyst to the regenerator vessel. An embodiment of the invention is one, any or all of prior embodiments in this paragraph up through the third embodiment in this paragraph further comprising fluidizing an intermediate section of the bed of catalyst that is below the upper section and above the lower section by distributing gas below the intermediate section and above the lower section and initiating the fluidizing of the upper section before initiating the fluidizing of the intermediate section and initiating the fluidizing of the intermediate section before initiating the fluidizing of the lower section. An embodiment of the invention is one, any or all of prior embodiments in this paragraph up through the third embodiment in this paragraph further comprising reducing the flow rate of distributing gas below the upper section to fluidize the upper section after initiating fluidizing the lower section. An embodiment of the invention is one, any or all of prior embodiments in this paragraph up through the third embodiment in this paragraph further comprising increasing the flow rate of fluidizing gas below the lower section for fluidizing the lower section gradually. An embodiment of the invention is one, any or all of prior embodiments in this paragraph up through the third embodiment in this paragraph further comprising delivering water to an inner tube of a nested tubes; indirectly heating the water to steam or higher pressure steam in the catalyst bed; withdrawing the steam from the catalyst bed through an outer tube of the nested tubes. An embodiment of the invention is one, any or all of prior embodiments in this paragraph up through the third embodiment in this paragraph further comprising fluidizing the upper section with gas distributed from a fluidization distributor protruding laterally through the side of the vessel. An embodiment of the invention is one, any or all of prior embodiments in this paragraph up through the third embodiment in this paragraph further comprising fluidizing the lower section with gas distributed from an elongated fluidization distributor extending longitudinally through the vessel.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for fluidizing a bed of catalyst in a vessel comprising internals and said bed of catalyst:
fluidizing an upper section of the bed of catalyst by distributing gas below said upper section;
fluidizing a lower section of the bed of catalyst that is below said upper section by distributing gas below said lower section; and
initiating said fluidizing of said upper section before initiating said fluidizing of said lower section.

2. The process of claim 1 further comprising fluidizing an intermediate section of the bed of catalyst that is below said upper section and above said lower section by distributing gas below said intermediate section and above said lower section and initiating said fluidizing of said upper section before initiating said fluidizing of said intermediate section and initiating said fluidizing of said intermediate section before initiating said fluidizing of said lower section.

3. The process of claim 1 further comprising fluidizing said upper section with gas distributed from a fluidization distributor protruding laterally through the side of the vessel.

4. The process of claim 1 further comprising fluidizing said lower section with gas distributed from an elongated fluidization distributor extending longitudinally through the vessel.

5. The process of claim 1 further comprising reducing the flow rate of fluidizing gas below said upper section to fluidize said upper section after initiating fluidizing said lower section.

6. The process of claim 5 further comprising increasing the flow rate of distributing gas below said lower section for fluidizing said lower section gradually.

7. The process of claim 1 further comprising delivering water to an inner tube of a nested tubes; indirectly heating said water to steam or to higher pressure steam in said catalyst bed; withdrawing said steam from said catalyst bed through an outer tube of said nested tubes.

8. The process of claim 1 further comprising: combusting coke from spent catalyst in a regenerator to provide regenerated catalyst and flue gas; passing hot catalyst from said regenerator to said vessel to cool said hot catalyst; and passing cooled catalyst back to said regenerator.

9. A process for starting fluidization of a bed of catalyst in a catalyst cooler vessel comprising internals and said bed of catalyst:
fluidizing an upper section of the bed of catalyst by distributing gas below said upper section;
fluidizing a lower section of the bed of catalyst that is below said upper section by distributing gas below said lower section;
initiating said fluidizing of said upper section before initiating said fluidizing of said lower section;
combusting coke from spent catalyst in a regenerator vessel and disengaging hot catalyst from flue gas in said regenerator vessel; and
passing said hot catalyst to said catalyst cooler vessel to said bed of catalyst to cool said hot catalyst; and
passing said cooled catalyst to said regenerator vessel.

10. The process of claim 9 further comprising fluidizing an intermediate section of the bed of catalyst that is below said upper section and above said lower section by distributing gas below said intermediate section and above said lower section and initiating said fluidizing of said upper section before initiating said fluidizing of said intermediate section and initiating said fluidizing of said intermediate section before initiating said fluidizing of said lower section.

11. The process of claim 9 further comprising reducing the flow rate of distributing gas below said upper section to fluidize said upper section after initiating fluidizing said lower section.

12. The process of claim 11 further comprising increasing the flow rate of fluidizing gas below said lower section for fluidizing said lower section gradually.

13. The process of claim 9 further comprising delivering water to an inner tube of a nested tubes; indirectly heating said water to steam or higher pressure steam in said catalyst bed; withdrawing said steam from said catalyst bed through an outer tube of said nested tubes.

14. The process of claim 9 further comprising fluidizing said upper section with gas distributed from a fluidization distributor protruding laterally through the side of the vessel.

15. The process of claim 11 further comprising fluidizing said lower section with gas distributed from an elongated fluidization distributor extending longitudinally through the vessel.

* * * * *